(12) United States Patent
Fukumori et al.

(10) Patent No.: US 7,003,933 B2
(45) Date of Patent: Feb. 28, 2006

(54) ROLL-BALER

(75) Inventors: Kouichi Fukumori, Mie (JP); Akira Muraki, Mie (JP); Yuji Uemura, Mie (JP); Masanobu Okumura, Mie (JP); Yukinori Shibuya, Saitama (JP); Hirokatsu Shito, Saitama (JP); Nobuki Yamana, Saitama (JP)

(73) Assignees: Takakita Co., Ltd., Mie (JP); Institute of Agricultural Machinery Bio-oriented Technology Research Advancement Institution, Saitama (JP)

( * ) Notice: Subject to any disclaimer, the term of this patent is extended or adjusted under 35 U.S.C. 154(b) by 192 days.

(21) Appl. No.: 10/669,681

(22) Filed: Sep. 25, 2003

(65) Prior Publication Data

US 2004/0074209 A1  Apr. 22, 2004

(30) Foreign Application Priority Data

Oct. 18, 2002  (JP)  ............................ 2002-303967

(51) Int. Cl.
- B65B 57/00 (2006.01)
- B65B 63/04 (2006.01)
- A01F 15/07 (2006.01)

(52) U.S. Cl. ............................ 53/504; 53/118; 53/587; 53/211; 56/341; 100/4; 100/5; 100/76; 100/88

(58) Field of Classification Search ................ 53/116, 53/118, 587, 211, 504; 100/5, 76, 87–89; 56/341

See application file for complete search history.

(56) References Cited

U.S. PATENT DOCUMENTS

| | | | | |
|---|---|---|---|---|
| 2,627,223 A | * | 2/1953 | Berge | 100/5 |
| 4,602,471 A | * | 7/1986 | Gray et al. | 53/118 |
| 5,255,501 A | * | 10/1993 | McWilliams | 56/341 |
| 6,032,446 A | * | 3/2000 | Gola et al. | 56/341 |
| 6,263,650 B1 | * | 7/2001 | Deutsch et al. | 56/16.4 B |
| 6,321,507 B1 | * | 11/2001 | Copeland et al. | 53/118 |
| 6,591,743 B1 | * | 7/2003 | Deutsch et al. | 100/88 |
| 6,729,118 B1 | * | 5/2004 | Viaud | 56/341 |

FOREIGN PATENT DOCUMENTS

JP  09023739 A  *  1/1997

* cited by examiner

Primary Examiner—Stephen F. Gerrity
(74) Attorney, Agent, or Firm—Browdy and Neimark, P.L.L.C.

(57) ABSTRACT

A roll baler equipped with a hopper 2, and a transporting conveyor 3 for carrying bale shaping material discharged from beneath a discharge port 20 defined in the bottom face of the hopper 2 into a material receiving port 40 of the bale-shaping chamber, wherein the transporting conveyor 3 is divided into two parts of: a hopper-side transporting conveyor 3a provided in a space extending from beneath the discharge port 20 to the front position beneath the delivery mechanism 5; and a bale-shaping-chamber side transporting conveyor 3b provided in the space extending from beneath the delivery mechanism 5 to the receiving port 40 of the shaping chamber 4, both these hopper-side transporting conveyor 3a and bale-shaping-chamber-side transporting conveyor 3b being each driven independently one from the other.

3 Claims, 5 Drawing Sheets

ROLL-BALER

BACKGROUND OF THE INVENTION a) Field of the Invention

This invention relates to improvement in roll-baler of a type, which feeds materials such as harvested and shredded farm product for fodder, or the like, into a shaping chamber mounted on a machine frame, to be shaped and packaged into a roll-bale of a required configuration, wherein the machine body has no pick-up device for picking up the shaping material such as harvested fodder product, etc., but instead of such pick-up device, there is mounted a hopper for receiving such fodder product to be shaped into the roll-bale. A transporting conveyor installed beneath the bottom part of the hopper is mounted, so as to carry forward the shaping material as received into the hopper.

b) Description of Prior Arts

Of the roll-baler of the abovementioned type, there is a similar one which was developed by the present applicants (vide: Japanese patent application No. 2001-352852, which corresponds to U.S. patent application Ser. No. 10/207,807 in the name of Kouichi FUKUMORI et al.

This roll-baler (referred to as "A" in FIG. 1 of the accompanying drawing) is of such a construction that a hopper 2 for receiving thereinto materials to be shaped into a roll-bale is mounted on the side of the front part of the machine body 1 which moves by means of travelling wheels 10, that a transporting conveyor 3 for carrying rearwardly the shaping materials to be discharged from the discharge port 20 which is defined in the bottom part of the hopper 2 is mounted below this discharge port; that, on the side of the rear part of the machine body 1, there is mounted a shaping chamber (or, bale-chamber) 4 which receives, through a receiving port 40, the shaping materials to be transported rearwardly by the abovementioned transporting conveyor 3, and is shaped into the roll-bale by means of a bale-shaping device 41 accommodated in the shaping chamber 4, in the intermediate part of the machine body 1 between this bale-shaping chamber 4 and the hopper 2, there is mounted a delivery mechanism 5 for delivering twine or net for packaging the roll-bale of the fodder material, etc., which has completed its shaping in the abovementioned bale-shaping chamber 4; and that, in the bottom part of the inner cavity of the abovementioned hopper 2, there is provided agitators 6, 6, . . . for delivering the shaping materials as received into the hopper 2 to the discharge port 20.

The roll-baler A as illustrated in FIG. 1 of the accompanying of this application is constructed in a traction type, which is drawn by a tractor, and other pulling vehicles, linked with the roll-baler. At the forward end of the machine body, there are mounted a connecting rod 11 for joining the machine body to a hitch provided on the rear face of the body of the traction vehicle, and a universal joint shaft 13 for linking an input shaft 12 with a PTO shaft equipped on the traction vehicle. By this input shaft 12 supported on the machine body 1, with its being connected to the rear end side of the universal-joint shaft 13, rotational power is transmitted for driving the transporting conveyor 3, the bale-shaping device 41 equipped in the bale-shaping chamber 4, and the delivery mechanism 5 of the twine (or net).

This roll-baler A is used in such a fashion that the shaping material which is harvested and shredded by a harvester as mounted on the traction vehicle, or a separate tractor running along with the traction vehicle, and then the shaping material discharged through a chute is received into the hopper 2 to be temporarily stored therein, and then this shaping material, being discharged from the discharge port 20 of the hopper 2, is forwarded by means of the transporting conveyor 3 into the bale-shaping chamber 4 so as to be shaped into the roll-bale; or the roll-baler A is used in such a fashion that the shaping-material, which is harvested and shredded by a harvester and then thrown into a bonnet wagon or a loader bucket, which is equipped on the tractor with the harvester being mounted thereon, is received into the hopper 2 from the bonnet wagon or the loader bucket for its temporary storage therein until it is discharged from the discharge port 20 of the hopper 2 and is forwarded by means of the transporting conveyor 3 into the shaping chamber 4 so as to be shaped into the roll-bale.

As described in the foregoing, the roll-baler of the type, having no pick-up device provided on its machine body, but instead, the hopper for receiving the shaping material is mounted on the machine body, and this shaping material is thrown into this hopper and temporarily stored therein, followed by its being discharged sequentially through the discharge port defined in the bottom part of the hopper into the bale-shaping chamber by means of the transporting conveyor to form the final roll-bale, has a problem, when the roll bale to be shaped within the bale-shaping chamber reaches its predetermined diameter or roll-pressure, and then when the twine (or net) is delivered from the delivery mechanism by actuating the same to package the roll-bale, the shaping material dropping through small clearance (or gap) among the adjacent agitators would be sent into the shaping chamber, together with the transporting conveyor accompanying the twine (or net), with the consequence that the dropped material adheres onto the outer periphery of the twine or net as wound, and, when the roll-bale as shaped and packaged is discharged from the shaping chamber, the twine (or net) as adhered onto the roll-bale tends to drop downward, thereby causing undesirable loss in the bale-shaping.

Moreover, conventional roll-baler needs to be stopped during a span of time, when the shaped roll bale is liberated from the twine (or net) winding until the shaping material is again taken into the shaping chamber, which inevitably invites an inconvenience such that operating efficiency of the machine would become lowered.

Incidentally, with the roll-baler of the type, equipped with the pick-up device, the abovementioned problem would not occur, because, if and when the roll bale formed in the bale-shaping chamber reaches a predetermined diameter or roll-pressure, and is to be packaged with twine (or net), no shaping material is picked up by the pick-up device due to stoppage of the moving machine body, as the consequence of which the transporting conveyor which is integral with the pick-up device forwards the twine (or net) alone into the bale-shaping chamber.

The roll baler of the abovementioned type, however, forwards into the shaping chamber the shaping material alone which has been thrown into the hopper, which material would be discharged from the discharge port defined in the bottom part of the hopper and sent into the bale-shaping chamber, irrespective of whether the machine body is running or in stoppage.

Since this transporting conveyor is indispensable for guiding the twine (or net) which is delivered from the delivery mechanism toward the shaping chamber, it should not be stopped by any means.

On account of this, it is so devised that driving of the agitators installed in the bottom part of the inner cavity of the hopper is stopped, thereby ceasing the discharge of the shaping material through the discharge port defined in the bottom part of the hopper.

The abovementioned problem is caused by the shaping material which is dropped from the gaps among the adjacent agitators, the driving of which is in stoppage, hence it is unavoidable with the roll baler of the abovementioned type.

SUMMARY OF THE INVENTION

The present invention has been made with a view to solving the abovementioned problem, and aims at providing a novel means for feeding the twine (or net) which is delivered from the delivery mechanism onto and around the peripheral surface of the roll bale within the shaping chamber by means of the transporting conveyor, while avoiding dropping off the shaping material into the shaping chamber through the gaps among the adjacent agitators.

For attaining the abovementioned objective, the present invention is so devised that the transporting conveyor to carry the shaping material is divided into two parts, i.e., front half side (starting end side) and the rear half side (terminating end side), each part being driven for operation independently.

The front half side of the transporting conveyor is mounted on the machine body, as the hopper-side transporting conveyor by so positioning the same to extend from the front end part of the space below the delivery mechanism to be disposed between the hopper and the shaping chamber, from beneath the discharge port defined in the bottom part of the hopper on the machine body; while the rear half side of the transporting conveyor is mounted on the machine body as the shaping-chamber side transporting conveyor by so positioning the same to extend from the lower space of the delivery mechanism to the receiving port of the shaping chamber. In this case, the starting end part of the shaping-chamber-side transporting conveyor is mounted on the machine body by positioning the starting end part thereof to lap with the upper and lower positions of the terminal end part of the hopper-side transporting conveyor, beneath the terminal end part of the hopper-side transporting conveyor.

And then, when the sensing device for sensing the shaping pressure of the shaping material to be formed into the roll bale within the shaping chamber performs its sensing action, the hopper-side transporting conveyor positioned at the starting end side of the transporting conveyor, as divided, is made capable of stopping the transporting operation of the shaping material by stoppage of its driving. In this condition, the twine (or net) to be delivered from the delivery mechanism is forwarded into the shaping chamber by means of the shaping-chamber-side transporting conveyor, which is being continuously driven, to package the shaping material as shaped into the roll bale of a predetermined diameter within the shaping chamber.

According to the bale-shaping device of the present invention, the shaping material to be discharged from the discharge port of the hopper is carried out by the hopper-side transporting conveyor, which material is carried over to the shaping-chamber-side transporting conveyor. And, by means of this shaping-chamber-side transporting conveyor, the shaping material is sent into the bale-shaping chamber through the receiving port of the shaping chamber to shape the same into the desired roll bale. Upon completion of its shaping, if and when the shaped roll bale is packaged with the twine (or net), the carrying of the shaping material is disconnected by stopping the driving of the hopper-side transporting conveyor, whereby it becomes possible to introduce and guide the twine (or net), which is delivered by the action of the delivery mechanism, on and around the peripheral surface of the roll bale within the shaping chamber, by means of the continuously working shaping-chamber-side transporting conveyor. In this way, appropriate and adequate packaging, free from its shaping loss, can be attained by the feeding of the twine (or net) into the shaping chamber, without unnecessary shaping material being brought into the shaping chamber.

The foregoing object, other objects, and specific construction and operation of the roll baler according to the present invention will become more apparent and understandable from the following detailed description thereof, when read in conjunction with the accompanying drawing.

BRIEF DESCRIPTION OF THE ACCOMPANYING DRAWING

DETAILED DESCRIPTION OF THE PREFERRED EMBODIMENTS

In the following, a preferred embodiment of the present invention will be described in detail in reference to the accompanying drawing.

Figure 1:
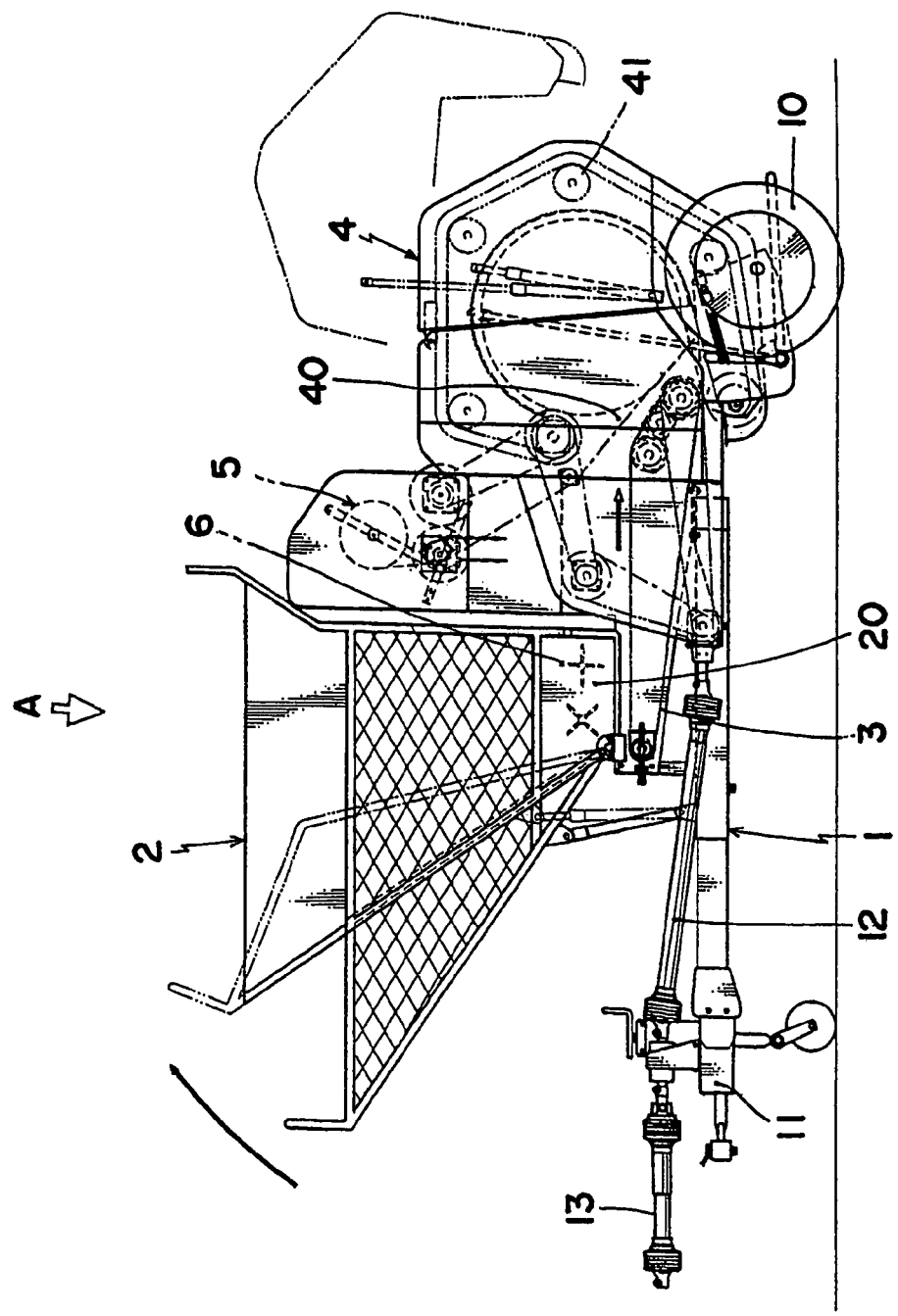
FIG. 1 is a side elevational view of a conventional roll baler.
Figure 2:
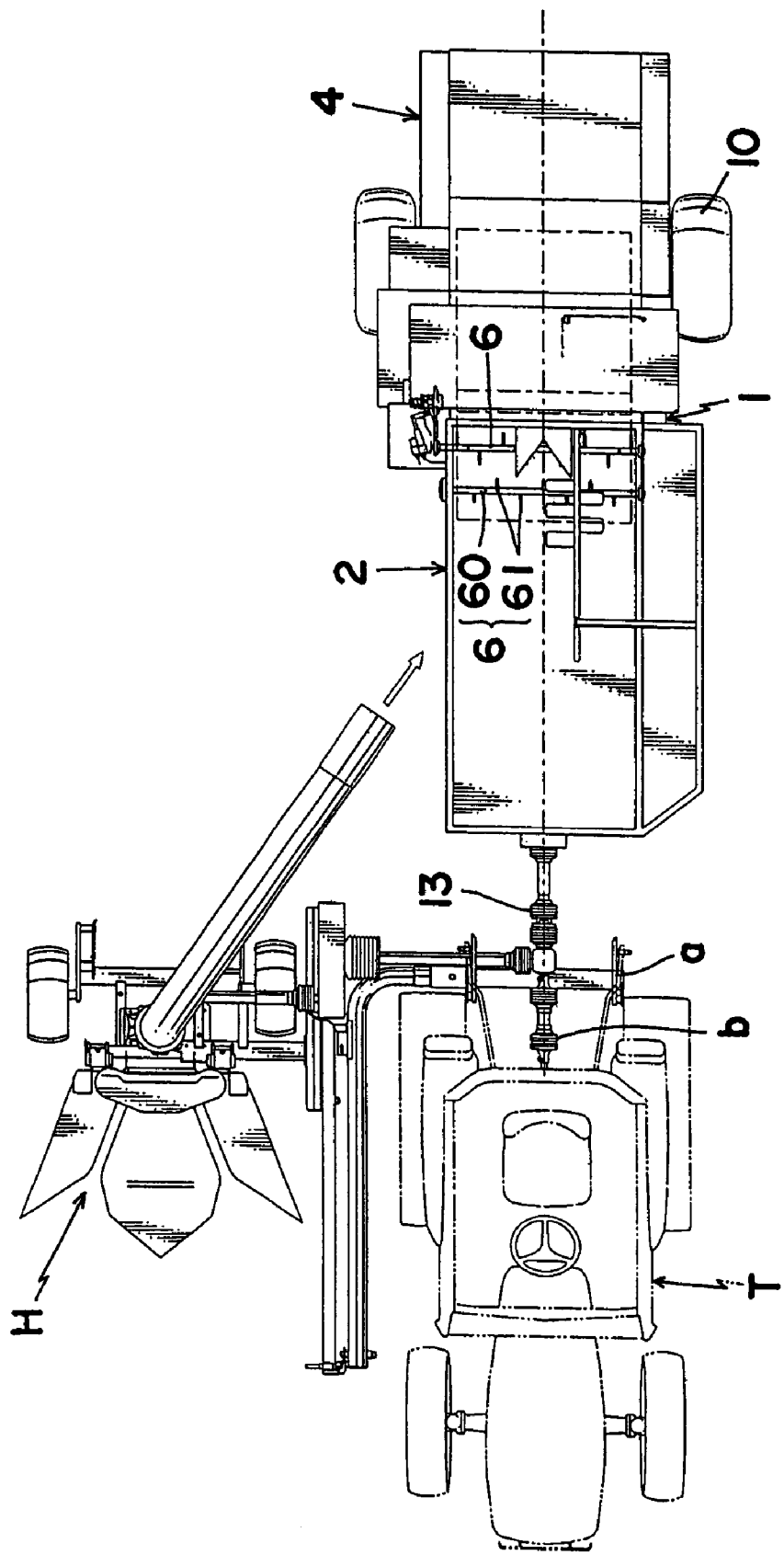
FIG. 2 is a plan view of the roll-baler, in which the roll-baler of the present invention has been incorporated.
Figure 3:
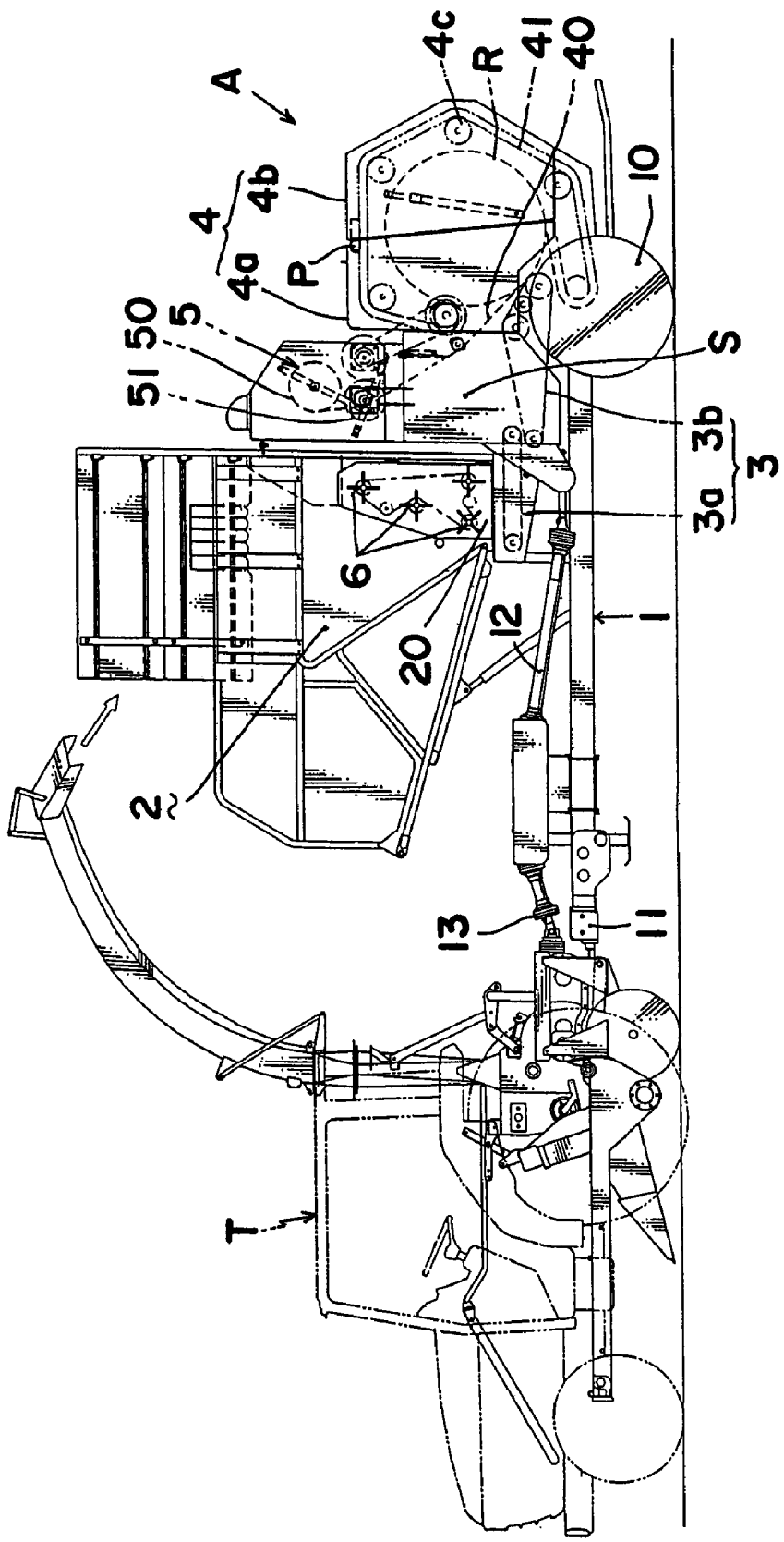
FIG. 3 is a side elevational view of the roll-baler as shown in FIG. 2.

FIG. 2 is a plan view of the roll baler A, in which the device of the present invention is incorporated; and FIG. 3 is a side elevational view of the roll baler shown in FIG. 2, with one part being cut away.

In these figures of the drawing, a reference numeral I designates the machine body; a numeral 2 refers to the hopper; a reference numeral 3 indicates the transporting conveyor; a numeral 4 refers to the bale-shaping chamber; and a numeral 5 refers to the delivery mechanism.

The machine body 1 is for supporting the hopper 2 and the bale-shaping chamber 4, etc., and is in the form of a frame which may be constructed in any appropriate configuration and structure. In the illustrated embodiment, it is formed in a chassis frame which is self-navigable on the travelling wheels 10, 10, . . .

In the illustrated embodiment, the roll baler A is constructed in a traction type. In the forward end side of this machine body 1, there are provided a connecting rod 11, and a joint section of an input shaft 12 in the form of a universal joint shaft 13. In this construction, the front end of the connecting rod 11 is joined to the connecting hitch a equipped on the rear face of the vehicle body of the tractor T, and the universal joint 13 is connected to the PTO shaft 12 of the tractor T, as shown in FIG. 3, whereby the roll baler A is pulled to travel by the tractor T, as shown in FIGS. 2 and 3, and each and every operating part of the roll baler, as mounted on the machine body 1 is made to work by a prime mover on the side of the tractor T.

It goes without saying that the machine body 1 may be constructed in a self-navigable type roll baler having its prime mover mounted thereon, to thereby drive the travelling wheels 10, 10, and each and every operating part thereof. The hopper 2 is to receive temporarily the shaping material such as harvested and shredded farm product for fodder, or the like by means of the harvester H which is connectively mounted on the lateral face of the tractor T for pulling the machine body 1 as shown in FIG. 2 above. This hopper 2 is of a conventional type, with its upper face side being open to serve as the material receiving port, and with its bottom face side being open in a funnel shape to define the discharge port 20, and is mounted on the machine body 1 at an appropriate position. In this illustrated embodiment, the hopper is mounted on the machine body 1 at its appropriate position to the side of the front part of the machine body 1. On its part positioned above the discharge port 20 in its interior, there are supported, in parallel, the agitators 6, 6, . . . , each having agitating blades 61 provided on its rotational shaft 60 which crosses through the hopper interior.

The transporting conveyor 3 is to send the shaping material discharged from the discharge port 20 of the abovementioned hopper 2 toward the receiving port 40 of the shaping chamber 4. This transporting conveyor 3 is mounted on the machine body 1 between the lower position of the discharge port 20 of the hopper 2 and the receiving port 40 of the shaping chamber 4, the construction of which will be described later in more detail.

The bale-shaping chamber 4 is of a conventional type, and is to shape the shaping material sent into the receiving port 40 thereof into the roll bale R by means of the bale-shaping apparatus 41 comprising a tightbar which rotates in circulation, and which is installed within the baleshaping chamber 4. This shaping chamber is mounted on the machine body 1 at a position in the conveying direction of the transporting conveyor with a predetermined space interval S along the abovementioned transporting direction.

In case the carrying direction of the transporting conveyor 3 to feed the shaping material discharged from the discharging port 20 defined in the bottom face of the hopper 2 is set in the left-right direction with respect to the front-back direction (a moving direction) of the machine body 1, the bale-shaping chamber 4 is disposed at a position where the abovementioned space interval S is defined along the above mentioned transporting direction at one lateral side of the hopper 2 mounted on the machine body 1.

In this case, the shaping chamber 4 is fixedly mounted on the machine body, with its one half side being designated as a fixed side 4a, and with its one other half side being designated as a rotational side 4b, the latter being assembled and supported onto the abovementioned fixed side 4a fastened to the machine body 1, in a freely rotational manner around a hinge P as the center. When the roll bale R, which has completed its shaping and packaging, is to be discharged from the shaping chamber 4 by opening the chamber through the rotation of its rotational side 4b, the shaping chamber 4 is mounted on the lateral end part of the machine body 1 in such a manner that the bale-shaping chamber 4 may become open outwardly of the machine body 1 by the rotation of its rotational side 4b.

Further, in the case that the carrying direction of the transporting conveyor 3 is set in the direction along the back-and-forth direction of the machine body 1, and the shaping material is transported backward of the machine body 1, the shaping chamber 4 is disposed at a position spaced apart from the hopper 2 at its rearward direction with the abovementioned space interval S, and mounted on the machine body 1.

In this case, too, if and when the shaping chamber is constructed in such a manner that the fixed side 4a of the one half side of the shaping chamber 4 is fixedly mounted on the machine body 1, while the rotational side 4b of the other half side is assembled and supported on the fixed side 4a in a freely rotatable manner on and around the hinge P as the center, to enable the roll bale R which has been shaped and packaged in the shaping chamber 4 to be discharge by the rotation of its rotational side 4b, the shaping chamber 4 is mounted on the rear end part of the machine body 1 so as to cause the shaping chamber 4 to be mounted on the rear end part of the machine body 1, so that the shaping chamber 4 becomes open rearwardly of the machine body 1 due to rotation of the rotating side 4b.

The delivery mechanism 5 is of a conventional type, which comprises: a roll 50 of the twine (or net) for packaging the shaping material which has completed its shaping into the roll bale within the abovementioned shaping chamber 4; a delivery roll 51; and a guide 52. This delivery mechanism is provided on the upper part of the space interval S defined between the abovementioned hopper 2 and the shaping chamber 4.

Figure 6:
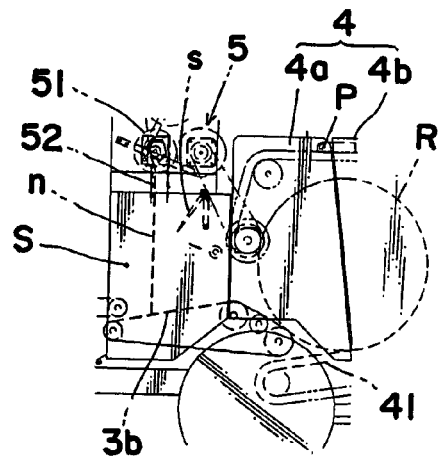
FIG. 6 is an explanatory diagram showing a state, when the net is delivered from the delivery mechanism.
Figure 7:
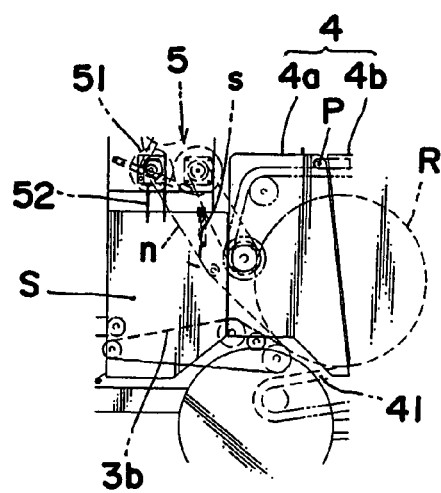
FIG. 7 is also an explanatory diagram showing a state, when the net as delivered from the delivery mechanism is wound on and around the roll bale.

At its initial stage of delivery, the twine (or net) n to be delivered from this delivery mechanism 5 droops into the abovementioned space interval S, as shown in, FIG. 6 with its bottom end coming into contact with, and being guided by the transporting conveyor 3 disposed on the bottom part of the space interval S, whereby the twine (or net) is delivered onto and around the peripheral surface of the roll bale R rotating within the shaping chamber 4, through the receiving port 40 of the bale-shaping chamber 4, being carried on the transporting conveyor 3, and becoming wound therearound.

Thus, the transporting conveyor 3, which carries the shaping material discharged from the discharge port 20 of the abovementioned hopper 2, is placed in the space interval S extending from beneath the discharge port 20 of the hopper 2 to the receiving port 40 of the bale-shaping chamber 4 through the bottom part of the space interval S, above which is installed the abovementioned delivery mechanism 5. This transporting conveyor 3 is split at an intermediate position in its transporting direction to be separated into the starting end side (front half side) and the terminal end side (rear half side), with its starting end side being made as the hopper-side transporting conveyor 3a and mounted on the machine body 1 by disposing the same in the space from beneath the discharge port 20 of the hopper 2 toward the front end part of the abovementioned space interval S, while, with its terminal end side being made as the shaping-chamber-side transporting conveyor 3b and disposed in the space extending from the bottom part of the abovementioned space interval S toward the receiving port 40 of the shaping chamber 4, and with its starting end part of the shaping-chamber-side transporting conveyor 3b, in its transporting direction, being positioned below the terminal end part of the hopper-side transporting conveyor 3a so as to overlap with the terminal end part of the terminal end part of the hopper-side transporting conveyor 3a, in the up-and-down relationship and be mounted on the machine body 1.

In this manner, when the shaping material within the hopper 2 is discharged out of the discharge port 20, the hopper-side transporting conveyor 3b receives this material. As soon as the material is discharged from the end part of the conveyor 3a, the shaping-chamber-side transporting conveyor 3a takes over the material so as to forward it to the receiving port 40 of the bale-shaping chamber 4.

And, these hopper-side transporting conveyor 3a and shaping-chamber-side transporting conveyor 3b are each linked to a drive mechanism so as to perform on-off control for their independent drive.

Figure 4:
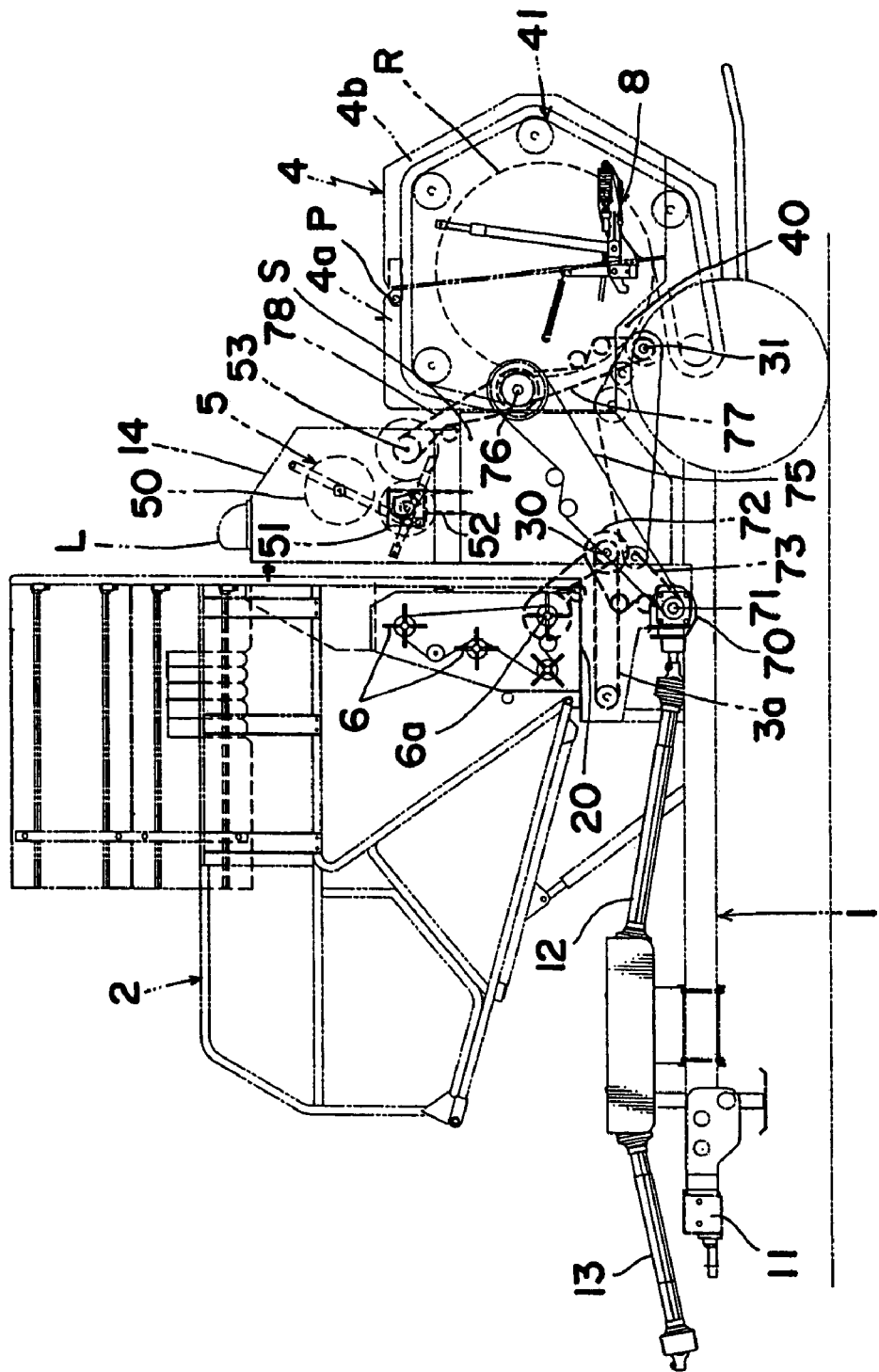
FIG. 4 is also a side elevational view of the power transmission mechanism for the roll-baler shown in FIG. 2 above.
Figure 5:
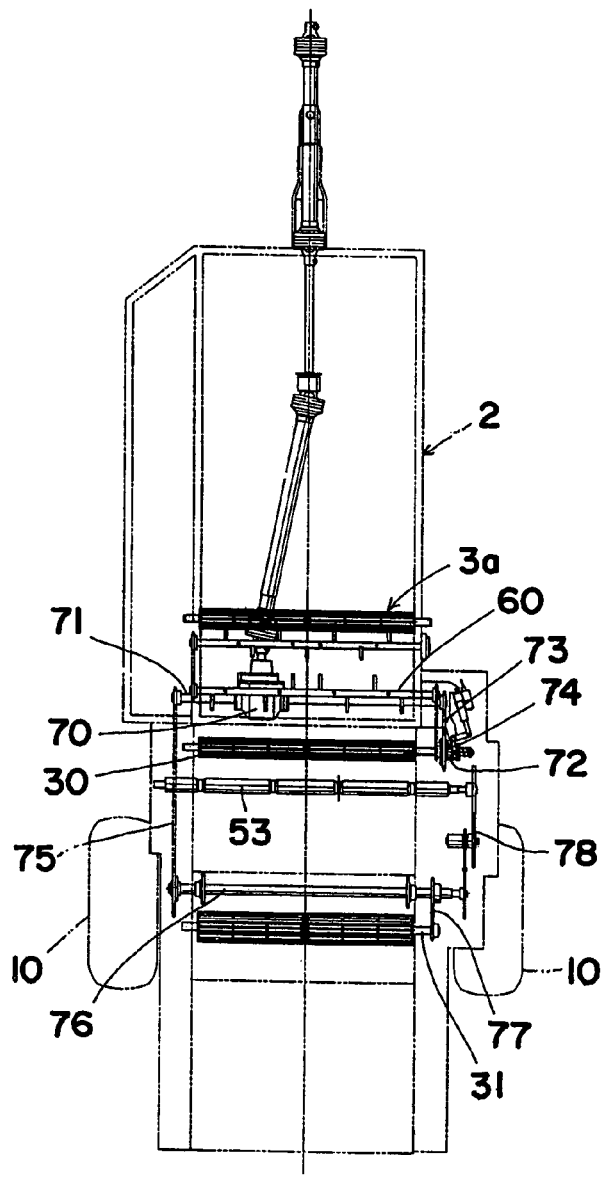
FIG. 5 is a plan view of the power transmission mechanism shown in FIG. 4.

The linkage of these transporting conveyors 3a, 3b to this drive mechanism will be explained in reference to the illustrated embodiment shown in FIGS. 4 and 5. The rear end side of the input shaft 12 which is supported on the machine body 1 is connected to a transmission shaft 71 which is pivotally and laterally supported on a power transmission case 70, through a power transmission mechanism (not shown in the drawing) which is accommodated in the interior of the power transmission case 70 supportively mounted on the machine body 1 in its middle part at a position before and after the machine body, and in the substantially center position at the left and right position of the machine body 1. At one of the shaft end parts, constituting the right end part shown in FIG. 5, the shaft end part of this power transmission shaft 71 at both left and right sides thereof is connected to a power transmission wheel 72 fitted on the roll shaft 30 at the terminal end side of the abovementioned hopper-side transporting conveyor 3a through a power transmission chain 73. The power transmission wheel 72 is interlocked with a clutch 74 which performs on-off operations by the action of a clutch lever with respect to the roll shaft 30. Finally, the power transmission wheel 72 is linked with the drive shaft 6a of the abovementioned parallely arranged agitators 6, 6, . . . , so as to effect driving and stopping of the hopper-side transporting conveyor 3a and the agitators 6, 6, . . . by the on-off operation of the clutch 74.

Further, with the other shaft end part (the left end side in FIG. 5) of the power transmission shaft 71, it is linked to the shaft end part of one of the roll-shaping drive shaft 76 (left side in FIG. 5), through the power transmission chain 75, and the other shaft end part of the roll-shaping drive shaft 76 is linked to the roll shaft 31 of the terminal end side of the shaping-chamber-side transporting conveyor 3b, through the power transmission chain 77. Furthermore, the other shaft end part of this roll-shaping drive shaft 76 is linked the net-delivery roller shaft 53 of the delivery mechanism 5, through the power transmission mechanism 78, to thereby perform driving of the hopper-side transporting conveyor 3a, the agitators 6, the shaping-chamber-side transporting conveyor 3b, the bale-shaping device 41 within the shaping chamber 4, and the delivery mechanism 5 for twine (or net). In this condition, the clutch 74 is brought to its "off" state to thereby cause the hopper-side transporting conveyor 3a and the agitators 6 to cease their driving.

In the power transmission mechanism 78 situated between the roll-shaping drive shaft 76 and the net-delivering roller shaft 53, there is incorporated a clutch (not shown in the drawing) which actuates the delivery mechanism 5 by bringing the power transmission mechanism to its "on" state, when the roll bale R to be formed within the shaping chamber 4 is shaped to a predetermined roll-diameter or pressure, and when the sensor 8 which senses its shaping pressure performs the sensing action. When the roll bale reaches its predetermined pressure, in regard to the bale-shaping material to be formed in the shaping chamber 4, the delivery mechanism 5 is actuated. As soon as the sensing device 8 performs its percepting action to sense the shaping pressure, the delivery mechanism 5 is actuated to its "on" state.

The sensing device 8 which senses that the shaping material to be formed into the roll bale within the shaping chamber 4 may be constructed in an electrical type. The sensing action which is achieved by catching the movement of the rotational side 4b of the shaping chamber 4, which rotates on the pivot of the hinge P, by means of a limit switch to emit an electrical signal. Otherwise, the clutch to control on-off operations of the delivery mechanism 5 which is controlled by its sensing action may also be an electrical type by use of an electromagnetic clutch. Moreover, the clutch 74 to be provided between the hopper-side transporting conveyor 3a and the power transmission shaft 71 may be constructed with the electromagnetic clutch.

By constructing the sensing device as such, when the sensor 8 performs its action to sense out a predetermined shaping pressure, the clutch 74 is brought to its "on" state to stop the action of the hopper-side transporting conveyor 3a and the agitators 6, or the clutch to control the driving of the delivery mechanism 5 is brought to its "on" state to actuate the delivery mechanism 5, thereby making it possible to deliver the twine (or net) to perform the packaging of the roll bale with no shaping material being discharged.

While the delivery mechanism is being actuated, a sensor s, shown in FIG. 6, is provided in the intermediate position between the delivery mechanism 5 and the shaping chamber 4 for sensing the twine (or net) n to be delivered from the delivery mechanism 5 and be guided into the receiving port 40 of the bale-shaping chamber 4. By the sensing action of this sensor s, the state of delivery of the twine (or net) from the delivery mechanism 5, the tractor operator can be alerted by a flashing patrol lamp L which is provided on the upper surface of the case 14 having therein the delivery mechanism 5 incorporated or a warning device such as buzzer, etc. to be placed on any appropriate location on the machine body 1.

As has been explained in the foregoing, since the roll baler according to the present invention is so constructed that the transporting conveyor 3 for carrying the shaping material discharged from the discharge port 20 of the hopper 2 into the receiving port 40 of the bale-shaping chamber 4 is divided into two of. the hopper-side transporting conveyor 3a which carries the shaping material discharged from the discharge port 20 of the hopper 2 up to a position Just in front of, and beneath, the delivery mechanism 5 for delivering the twine (or net); and the bale-shaping-chamber side transporting conveyor 3b which takes over the bale-shaping material discharged from the terminal end of the hopper-side transporting conveyor 3a to the receiving port 40 of the bale-shaping chamber 4, and each of these transporting conveyors 3a and 3b is driven independently from the other, it becomes possible to replenish the shaping material into the roll bale, being shaped in the shaping chamber 4, without seizing no excessive shaping material.

The present invention, solves the problem of bale-shaping material adhering onto the outer periphery of the twine (or net), when the roll bale as shaped and packaged is to be discharged from the shaping chamber. Accordingly, there is no shaping material dropping off from the material storage hopper during the bale-shaping operation.

Furthermore, due to division of the transporting conveyor into the hopper-side transporting conveyor and the bale-shaping-chamber side transporting conveyor, each being independently driven, when the pressure within the bale shaping chamber reaches a predetermined value, the hopper-side transporting conveyor is stopped to interrupt feeding of the bale-shaping material, during which the twine (or net) is fed and wound on and around the outer periphery of the completed roll bale and discharged from the shaping chamber after its packaging.

As the consequence, continuous bale-shaping operation can be done while the machine body is travelling, and bale-shaping material is fed into the hopper, whereby a high efficiency operation can be effectively attained.

In the foregoing, the roll-baler according to the present invention has been described in detail, with reference to a preferred embodiment thereof. It should, however, be understood that the invention is not limited to this embodiment alone, but any changes and modifications may be made in the construction of the device, within the spirit and scope of the invention as recited in the appended claims.

What is claimed is:

1. A roll-baler, comprising in combination:
   a hopper (2) for receiving thereinto bale-shaping material;
   a bale-shaping chamber (4) to form the shaping material into a desired roll bale R; and
   a machine body (1), on which said hopper and said chamber are mounted,
   a space interval S being defined between said hopper and said chamber;
   a delivery mechanism (5) for delivering twine or net mounted above said space interval S;
   a transporting conveyor (3) for transporting the shaping material discharged out of a discharge port (20) into a receiving port (40) of said bale-shaping chamber (4) in a space extending from below the discharge port defined in the lower surface of said hopper (2) over to said receiving port (40) of said shaping chamber (4) by way of said space interval S,
   said transporting conveyor (3) is divided into a hopper-side transporting conveyor (3a) provided in a space extending from below the discharge port (20) to a position beneath said delivery mechanism (5); and a shaping-chamber-side transporting conveyor (3b) provided to extend from beneath the delivery mechanism (5) to the receiving port (40) of said shaping chamber (4) so as to forward the shaping material discharged from the terminal end of the conveyor (3a) by taking the shaping material from the conveyor (3a), wherein each of said hopper-side transporting conveyor (3a) and said shaping-chamber-side transporting conveyor (3b) is driven independently one from the other through a power transmission mechanism from a power source.

2. The roll-baler according to claim 1, wherein said shaping-chamber-side transporting conveyor (3b) is disposed below the terminal end of said hopper-side transporting conveyor (3a), in such a manner that the starting end of said shaping-chamber-side transporting conveyor is overlappingly positioned beneath the terminal end of said hopper-side transporting conveyor, followed by mounting said both hopper-side transporting conveyor (3a) and shaping-chamber-side transporting conveyor (3b) on said machine body (1).

3. The roll-baler according to claim 1, wherein said hopper-side transporting conveyor (3a) is so controlled that the stoppage of driving of said hopper-side transporting conveyor is done by the sensing action of a sensor (8) which is incorporated to sense the shaping pressure in said shaping chamber (4).

* * * * *